United States Patent
Watson

(10) Patent No.: US 6,394,471 B1
(45) Date of Patent: May 28, 2002

(54) COLLAPSIBLE COIN CARRYING CART

(76) Inventor: Arleaf Watson, 134 Wall St., Jackson, MI (US) 49203

( * ) Notice: Subject to any disclaimer, the term of this patent is extended or adjusted under 35 U.S.C. 154(b) by 0 days.

(21) Appl. No.: 09/714,914

(22) Filed: Nov. 17, 2000

(51) Int. Cl.[7] .............................. B62B 1/00
(52) U.S. Cl. ............... 280/47.19; 280/47.26; 280/47.27; 280/47.35
(58) Field of Search ............ 280/42, 652, 654, 280/47.19, 47.24, 47.26, 47.28, 47.29, 47.18, 87.021, 87.05, 47.33

(56) References Cited

U.S. PATENT DOCUMENTS

| | | | |
|---|---|---|---|
| 2,949,314 A | * 8/1960 | Strohmaier | 280/36 |
| 3,804,432 A | * 4/1974 | Lehrman | 280/36 |
| 3,861,695 A | * 1/1975 | Shourek et al. | 280/5.24 |
| 4,363,496 A | * 12/1982 | Schreiner | 280/47.35 |
| 4,373,642 A | * 2/1983 | Wolters et al. | 220/72 |
| 5,040,809 A | * 8/1991 | Yang | 280/42 |
| 5,048,849 A | 9/1991 | Mathews et al. | |
| 5,240,264 A | * 8/1993 | Williams | 280/40 |
| 5,257,800 A | * 11/1993 | Yang | 280/654 |
| 5,294,009 A | 3/1994 | Maurer et al. | |
| 5,306,028 A | 4/1994 | Pike et al. | |
| 5,380,033 A | 1/1995 | Harling | |
| 5,464,107 A | * 11/1995 | McArthur | 211/133 |
| 5,465,987 A | * 11/1995 | Della Vecchia | 280/47.28 |
| 5,544,910 A | * 8/1996 | Esposito | 280/654 |
| 5,595,395 A | * 1/1997 | Wilson | 280/47.26 |
| D396,923 S | 8/1998 | Moore | |
| 6,131,926 A | * 10/2000 | Harlan | 280/47.26 |

* cited by examiner

*Primary Examiner*—Lanna Mai
*Assistant Examiner*—Kelly E Campbell

(57) ABSTRACT

A collapsible coin carrying cart for allowing users to easily carry coins won at casinos. The collapsible coin carrying cart includes a cart assembly including wheels, a pair of leg members mounted upon said wheels, and a plurality of first and second linkage members interconnecting the leg members; and also includes a plurality of coin storage units being removably mounted to said the assembly; and further includes fasteners being attached to the storage units for removably attaching the storage units to the cart assembly.

9 Claims, 2 Drawing Sheets

COLLAPSIBLE COIN CARRYING CART

BACKGROUND OF THE INVENTION

1. Field of the Invention

The present invention relates to a coin storing rack and more particularly pertains to a new collapsible coin carrying cart for allowing users to easily carry coins won at casinos.

2. Description of the Prior Art

The use of a coin storing rack is known in the prior art. More specifically, a coin storing rack heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,306,028; U.S. Pat. No. 5,048,849; U.S. Pat. No. 5,380,033; U.S. Pat. No. 5,294,009; U.S. Pat. No. 4,363,496; and U.S. Pat. No. Des. 396,923.

While these devices fulfill their respective, particular objectives and requirements, the aforementioned patents do not disclose a new collapsible coin carrying cart. The inventive device includes a cart assembly including wheels, a pair of leg members mounted upon said wheels, and a plurality of first and second linkage members interconnecting the leg members; and also includes a plurality of coin storage units being removably mounted to said the assembly; and further includes fasteners being attached to the storage units for removably attaching the storage units to the cart assembly.

In these respects, the collapsible coin carrying cart according to the present invention substantially departs from the conventional concepts and designs of the prior art, and in so doing provides an apparatus primarily developed for the purpose of allowing users to easily carry coins won at casinos.

SUMMARY OF THE INVENTION

In view of the foregoing disadvantages inherent in the known types of coin storing rack now present in the prior art, the present invention provides a new collapsible coin carrying cart construction wherein the same can be utilized for allowing users to easily carry coins won at casinos.

The general purpose of the present invention, which will be described subsequently in greater detail, is to provide a new collapsible coin carrying cart which has many of the advantages of the coin storing rack mentioned heretofore and many novel features that result in a new collapsible coin carrying cart which is not anticipated, rendered obvious, suggested, or even implied by any of the prior art coin storing rack, either alone or in any combination thereof.

To attain this, the present invention generally comprises a cart assembly including wheels, a pair of leg members mounted upon said wheels, and a plurality of first and second linkage members interconnecting the leg members; and also includes a plurality of coin storage units being removably mounted to said the assembly; and further includes fasteners being attached to the storage units for removably attaching the storage units to the cart assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible coin carrying cart which has many of the advantages of the coin storing rack mentioned heretofore and many novel features that result in a new collapsible coin carrying cart which is not anticipated, rendered obvious, suggested, or even implied by any of the prior art coin storing rack, either alone or in any combination thereof.

It is another object of the present invention to provide a new collapsible coin carrying cart which may be easily and efficiently manufactured and marketed.

It is a further object of the present invention to provide a new collapsible coin carrying cart which is of a durable and reliable construction.

An even further object of the present invention is to provide a new collapsible coin carrying cart which is susceptible of a low cost of manufacture with regard to both materials and labor, and which accordingly is then susceptible of low prices of sale to the consuming public, thereby making such collapsible coin carrying cart economically available to the buying public.

Still yet another object of the present invention is to provide a new collapsible coin carrying cart which provides in the apparatuses and methods of the prior art some of the advantages thereof, while simultaneously overcoming some of the disadvantages normally associated therewith.

Still another object of the present invention is to provide a new collapsible coin carrying cart for allowing users to easily carry coins won at casinos.

Yet another object of the present invention is to provide a new collapsible coin carrying cart which includes a cart assembly including wheels, a pair of leg members mounted upon said wheels, and a plurality of first and second linkage members interconnecting the leg members; and also includes a plurality of coin storage units being removably mounted to said the assembly; and further includes fasteners being attached to the storage units for removably attaching the storage units to the cart assembly.

Still yet another object of the present invention is to provide a new collapsible coin carrying cart that can be easily and conveniently set up and taken down.

Even still another object of the present invention is to provide a new collapsible coin carrying cart that allows the users to keep safe their winnings while at a casino.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
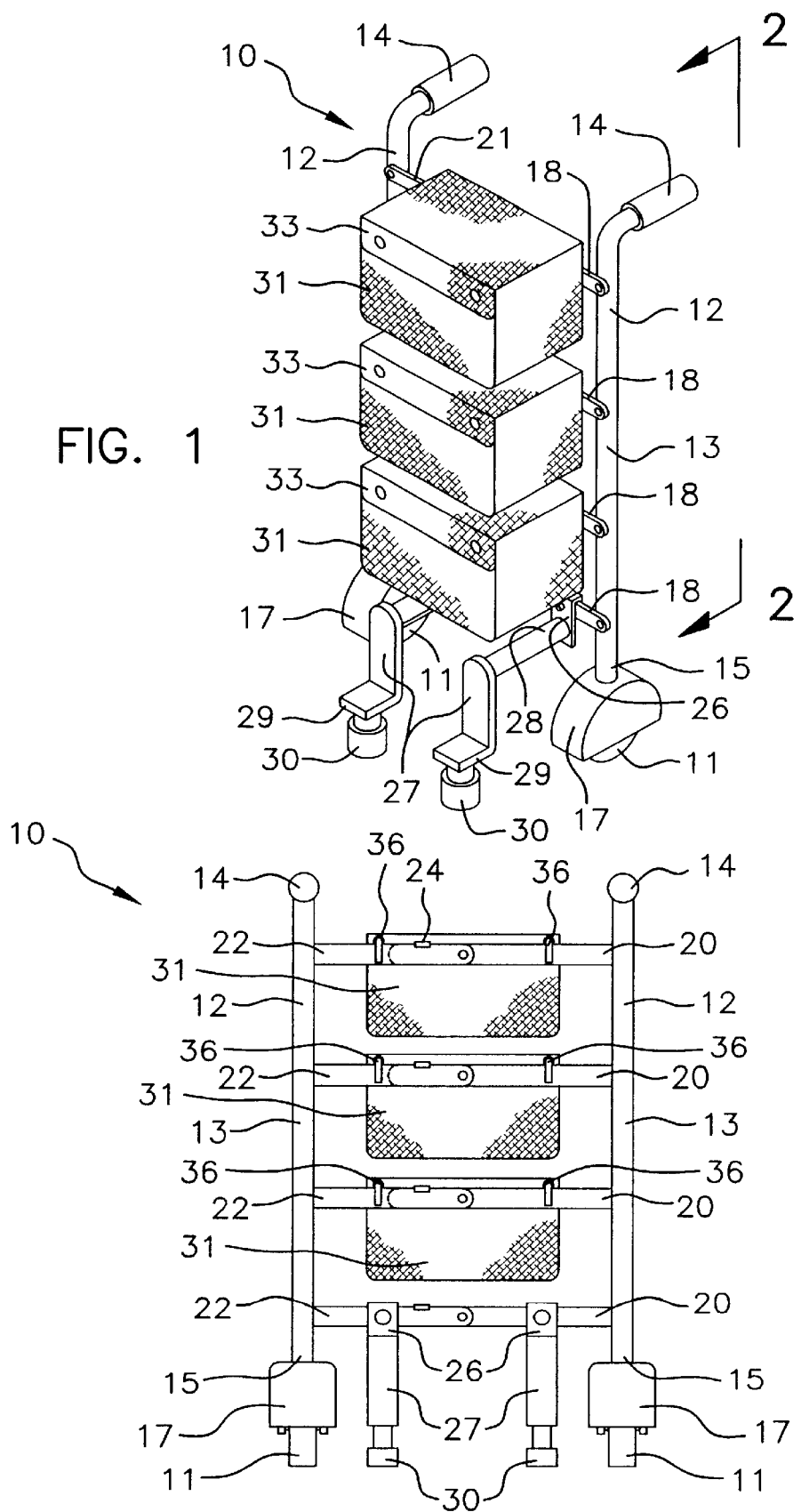
FIG. 1 is a perspective view of a new collapsible coin carrying cart according to the present invention.
FIG. 2 is a rear elevational view of the present invention.
Figure 3:
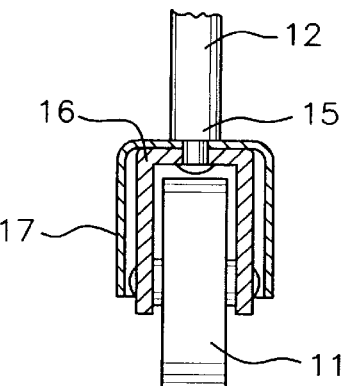
FIG. 3 is a detailed rear elevational view of one of the wheels of the present invention.
Figure 4:
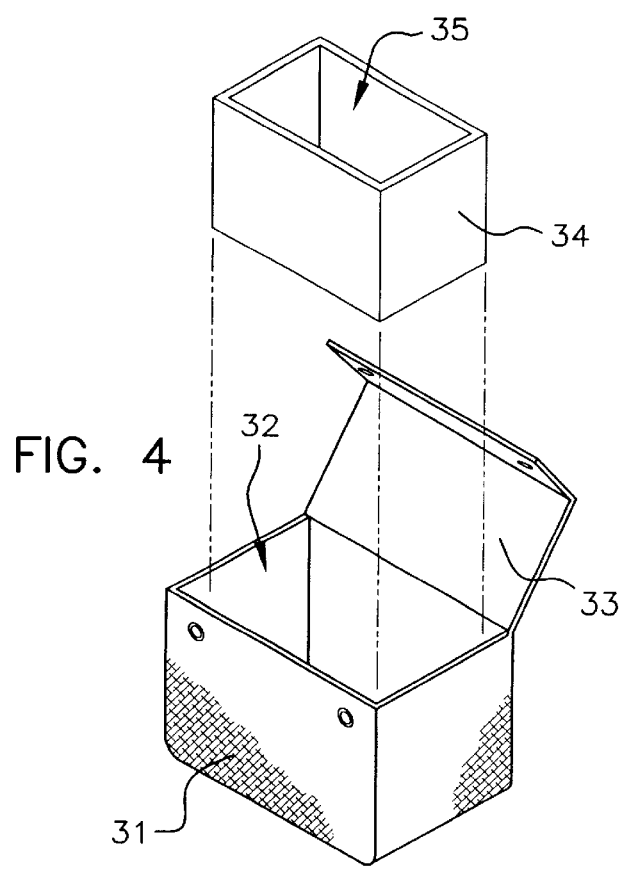
FIG. 4 is a detailed perspective view of one of the containers of the present invention.
Figure 5:
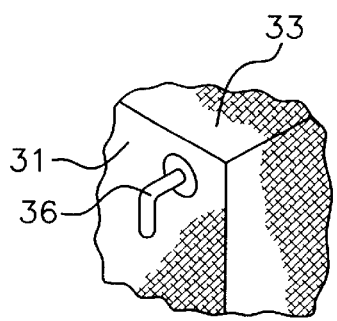
FIG. 5 is a detailed perspective view of one of the hook members of the present invention.
Figure 6:
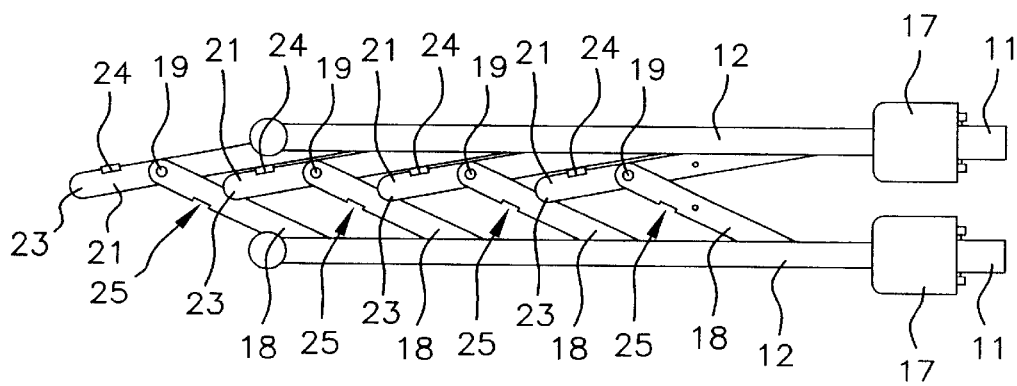
FIG. 6 is a side elevational view of the cart assembly of the present invention.

With reference now to the drawings, and in particular to FIGS. 1 through 6 thereof, a new collapsible coin carrying cart embodying the principles and concepts of the present invention and generally designated by the reference numeral 10 will be described.

As best illustrated in FIGS. 1 through 6, the collapsible coin carrying cart 10 generally comprises a cart assembly including wheels 11, a pair of leg members 12 conventionally mounted upon the wheels 11, and a plurality of first and second linkage members 18,21 interconnecting the leg members 12. Each of the leg members 12 includes a main portion 13, and also includes a handle portion 14, and further includes a bottom end 15. The handle portion 14 is angled relative to the main portion 13. The cart assembly further includes bracket members 16 being securely and conventionally attached to the bottom ends 15 of the leg members 12 and being mounted to axles of the wheels 11, and also includes fenders 17 being securely and conventionally attached to the bottom ends 15 of the leg members 12 and shrouding the bracket members 16 and partially shrouding the wheels 11. The first linkage members 18 have first ends 19 and second ends 20 which are pivotally attached to the main portion 13 of a respective one of the leg members 12. The first linkage members 18 are spaced along the leg member 12. The second linkage members 21 have first ends 22 and second ends 23 with the first ends 22 being pivotally attached to a respective one of the leg members 12. The second linkage members 21 are spaced along the leg member 12. The first ends 19 of the first linkage members 18 are pivotally attached to the second linkage members 21. Each of the second linkage members 21 has a latch member 24 being conventionally attached thereto, and each of the first linkage members 18 has a notch 25 disposed in an edge thereof and is adapted to receive a respective latch member 24 for releasably locking the first and second linkage members 18,21 together. The cart assembly further includes a leg support assembly being removably mounted to one of the first and second linkage members 18,21 for supporting the leg members 12 in upright positions. The leg support assembly includes a pair of leg support members each of which includes a mounting bracket 26 being removably attached to a respective one of the first and second linkage members 18,21, and also includes an angled support member 27 having a first end 28 which is securely and conventionally attached to the mounting bracket 26 and also having a second end 29, and further includes a padded foot member 30 being securely and conventionally attached to the second end 29 of the angled support member 27. The angled support member 27 is adapted to extend forwardly of the leg members 12 to support the leg members 12 in upright positions.

A plurality of coin storage units are removably mounted to the cart assembly. The plurality of coin storage units includes box-like members 31 having open tops 32 and lids 33 fastenably closeable over the open tops 32, and also includes cup-like containers 34 having open tops 35 and being removably received in the box-like members 31. Fasteners 36 are conventionally attached to the storage units for removably attaching the storage units to the cart assembly. The fasteners 36 include hook members 36 being securely and conventionally attached to back walls of the box-like members 31 and being removably retainable upon the first and second linkage members 18,21. The coin storage units are removably mounted upon the first and second linkage members 18,21.

In use, the user locks the first and second linkage members 18,21 together and mounts the mounting brackets 26 to the lowermost first and second linkage members 18,21 so that the leg members 12 stand upright, and the user then mounts the box-like members 31 upon the linkage members 18,21 and places one's coin winnings in the cup-like containers 34 which are conveniently carried in the box-like members 31.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible coin carrying cart comprising:
   a cart assembly including wheels, a pair of leg members mounted upon said wheels, and a plurality of first and second linkage members interconnecting said leg members;

a plurality of coin storage units being removably mounted to said cart assembly;

and fasteners being attached to said storage units for removably attaching said storage units to said cart assembly;

wherein each of said first linkage members being pivotally mounted to a respective one of said second linkage members, each respective pair of first and second linkage members having a deployed condition and a collapsed condition, said deployed condition being characterized by said first and second linkage members of each of said respective pairs being substantially aligned along a common longitudinal axis such that said leg members are moved away from each other, said collapsed condition being characterized by said first and second linkage members of each of said respective pairs being pivoted toward each other and said leg members are moved relatively closer to each other than said deployed position such that said cart assembly is laterally collapsible;

wherein said fastener on each of said storage units removably hangs said storage unit of said fastener on one of the respective pairs of first and second linkage members such that a weight of the storage unit is supported by said fastener on said respective pair of first and second linkage members and the weight of said storage unit biases said first and second linkage members into said deployed conditions;

wherein said cart assembly further includes a leg support assembly being removably mounted to one of said first and second linkage members for supporting said leg members in upright positions;

wherein said leg support assembly includes a pair of leg support members each of which includes a mounting bracket being removably attached to one of said respective pairs of said first and second linkage members, and also includes an angle support member having a first end which is securely attached to said mounting bracket and also having a second end, said angled support member being adapted to extend forwardly of said leg members to support said leg members in upright positions.

2. A collapsible coin carrying cart as described in claim 1, wherein each of said leg members includes a main portion, and also includes a handle portion, and further includes a bottom end, said handle portion being angled relative to said main portion.

3. A collapsible coin carrying cart as described in claim 1, wherein said cart assembly further includes bracket members being securely attached to bottom ends of said leg members and being mounted to axles of said wheels, and also includes fenders being securely attached to said bottom ends of said leg members and shrouding said bracket members and partially shrouding said wheels.

4. A collapsible coin carrying cart as described in claim 1, wherein said first linkage members have first ends and second ends which are pivotally attached to a respective one of said leg members, said first linkage members being spaced along said leg member.

5. A collapsible coin carrying cart as described in claim 4, wherein said second linkage members have first ends and second ends with said first ends being pivotally attached to a respective one of said leg members, said second linkage members being spaced along said leg member, said first ends of said first linkage members being pivotally attached to said second linkage members.

6. A collapsible coin carrying cart as described in claim 1, wherein each of said second linkage members has a latch member being attached thereto, and each of said first linkage members has a notch disposed in an edge thereof and being adapted to receive a respective said latch member for releasably locking said first and second linkage members together in said deployed position.

7. A collapsible coin carrying cart as described in claim 1, wherein said plurality of coin storage units include box-like members having interiors, open tops into said interiors, and lids closeable over said open tops, each of said coin storage units including a liner having an open top and being removably received in said interior of said coin storage unit such that said liner occupies substantially an entirety of the interior of said storage unit.

8. A collapsible coin carrying cart as described in claim 1, wherein said fasteners include hook members being securely attached to back walls of said box-like members and being removably retainable upon said first and second linkage members in a manner supporting said weight of an associated said storage unit independent of other said storage units and other said fasteners, said coin storage units being removably mounted upon said first and second linkage members.

9. A collapsible coin carrying cart comprising;

a cart assembly including wheels, a pair of leg members mounted upon said wheels, and a plurality of first and second linkage members interconnecting said leg members;

a plurality of coin storage units being removably mounted to said cart assembly; and fasteners being attached to said storage units for removably attaching said storage units to said cart assembly;

wherein each of said first linkage members being pivotally mounted to a respective one of said second linkage members, each respective pair of first and second linkage members having a deployed condition and a collapsed condition, said deployed condition being characterized by said first and second linkage members of each of said respective pairs being substantially aligned along a common longitudinal axis such that said leg members are moved away from each other, said collapsed condition being characterized by said first and second linkage members of each of said respective pairs being pivoted toward each other and said leg members are moved relatively closer to each other than said deployed position such that said cart assembly is laterally collapsible;

wherein said fastener on each of said storage units removably hangs said storage unit of said fastener on one of the respective pairs of first and second linkage members such that a weight of the storage unit is supported by said fastener on said respective pair of first and second linkage members and the weight of said storage unit biases said first and second linkage members into said deployed condition;

wherein each of said leg members includes a main portion, and also includes a handle portion, and further includes a bottom end, said handle portion being angled relative to said main portion;

wherein said cart assembly further includes bracket members being securely attached to bottom ends of said leg members and being mounted to axles of said wheels, and also includes fenders being securely attached to said bottom ends of said leg members and shrouding said bracket members and partially shrouding said wheels;

wherein said first linkage members have first ends and second ends which are pivotally attached to a respective one of said leg members, said first linkage members being spaced along said leg member;

wherein said second linkage members have first ends and second ends with said first ends being pivotally attached to a respective one of said leg members, said second linkage members being spaced along said leg member, said first ends of said first linkage members being pivotally attached to said second linkage members;

wherein each of said second linkage members has a latch member being attached thereto, and each of said first linkage members has a notch disposed in an edge thereof and being adapted to receive a respective said latch member for releasably locking said first and second linkage members together in said deployed position;

wherein said cart assembly further includes a leg support assembly being removably mounted to one of said first and second linkage members for supporting said leg members in upright positions;

wherein said leg support assembly includes a pair of leg support members each of which includes a mounting bracket being removably attached to one of said respective pairs of said first and second linkage members, and also includes an angled support member having a first end which is securely attached to said mounting bracket and also having a second end, said angled support member being adapted to extend forwardly of said leg members to support said leg members in upright positions;

wherein said plurality of coin storage units include box-like members having interiors, open tops into said interiors, and lids closeable over said open tops, each of said coin storage units including a liner having an open top and being removably received in said interior of said coin storage unit such that said liner occupies substantially an entirety of the interior of said storage unit; and wherein said fasteners include hook members being securely attached to back walls of said box-like members and being removably retainable upon said first and second linkage members in a manner supporting said weight of an associated said storage unit independent of other said storage units and other said fasteners, said coin storage units being removably mounted upon said first and second linkage members.

* * * * *